(12) United States Patent
Müller et al.

(10) Patent No.: US 6,603,649 B1
(45) Date of Patent: Aug. 5, 2003

(54) ELECTRONIC TRIPPING DEVICE FOR A CIRCUIT BREAKER

(75) Inventors: Thomas Müller, Neunkirchen am Brand (DE); Ulrich Baumgärtl, Berlin (DE); Wolfgang Röhl, Berlin (DE); Holger Hochgraef, Ganzer/Wusterhausen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/701,401

(22) PCT Filed: May 25, 1999

(86) PCT No.: PCT/DE99/01572

§ 371 (c)(1), (2), (4) Date: Mar. 5, 2001

(87) PCT Pub. No.: WO99/62159

PCT Pub. Date: Dec. 2, 1999

(30) Foreign Application Priority Data

May 28, 1998 (DE) .......................... 198 25 384

(51) Int. Cl.$^7$ .......................... H02H 7/30; H02H 3/00
(52) U.S. Cl. .......................... 361/93.3; 361/94
(58) Field of Search .......................... 361/104, 103, 361/93.2, 93.3, 94

(56) References Cited

U.S. PATENT DOCUMENTS

| | | | |
|---|---|---|---|
| 4,245,318 A | | 1/1981 | Eckart et al. |
| 4,809,125 A | * | 2/1989 | Matsko et al. .............. 361/93.3 |
| 4,958,252 A | * | 9/1990 | Murphy ...................... 361/87 |
| 5,136,457 A | * | 8/1992 | Durivage, III ............... 361/42 |
| 5,311,392 A | | 5/1994 | Kinney et al. |
| 5,402,299 A | | 3/1995 | Bellei |
| 5,627,713 A | | 5/1997 | Takeshi |
| 5,644,238 A | * | 7/1997 | Seifert et al. ............... 348/355 |

OTHER PUBLICATIONS

T. Schmelcher, "Low–Voltage Handbook", Technical Reference for Switchgear, Controlgear and Distribution Systems, (1984), pp. 84–90.

V.H.H. Johann, "Eine Formel für die Strom–Kennlinie von Schmelzsicherungen und ihre Anwendung zur Ermittlung von Kennwerten", Elcktrotechnische Zeitschrift 58 (1937), vol. 25, pp. 684–686*.

* cited by examiner

*Primary Examiner*—Kim Huynh
(74) *Attorney, Agent, or Firm*—Kenyon & Kenyon

(57) ABSTRACT

An electronic tripping device for a circuit breaker contains circuitry for simulating the response curve of a fuse. This circuitry can be controlled by a single setting mechanism representing the nominal currents or rated currents of fuses. This improves the coordination of protection in sophisticated power supply equipment containing both circuit breakers and fuses. Tripping devices equipped with microprocessors or operating in an analog fashion can be configured for the mode of operation. The new protection system achieves particularly safe operation for the user in that the setting mechanism is combined with a rating plug for the "fuse" mode, thus directly setting the tripping device to one current value. In a manner similar to a true fuse, consequently, the setting mechanism is provided with appropriate labeling. The simulated curves may contain a point of inflection below a limit in a lagging manner, to increase the nominal switching capacity and selectivity limit of a circuit breaker.

15 Claims, 4 Drawing Sheets

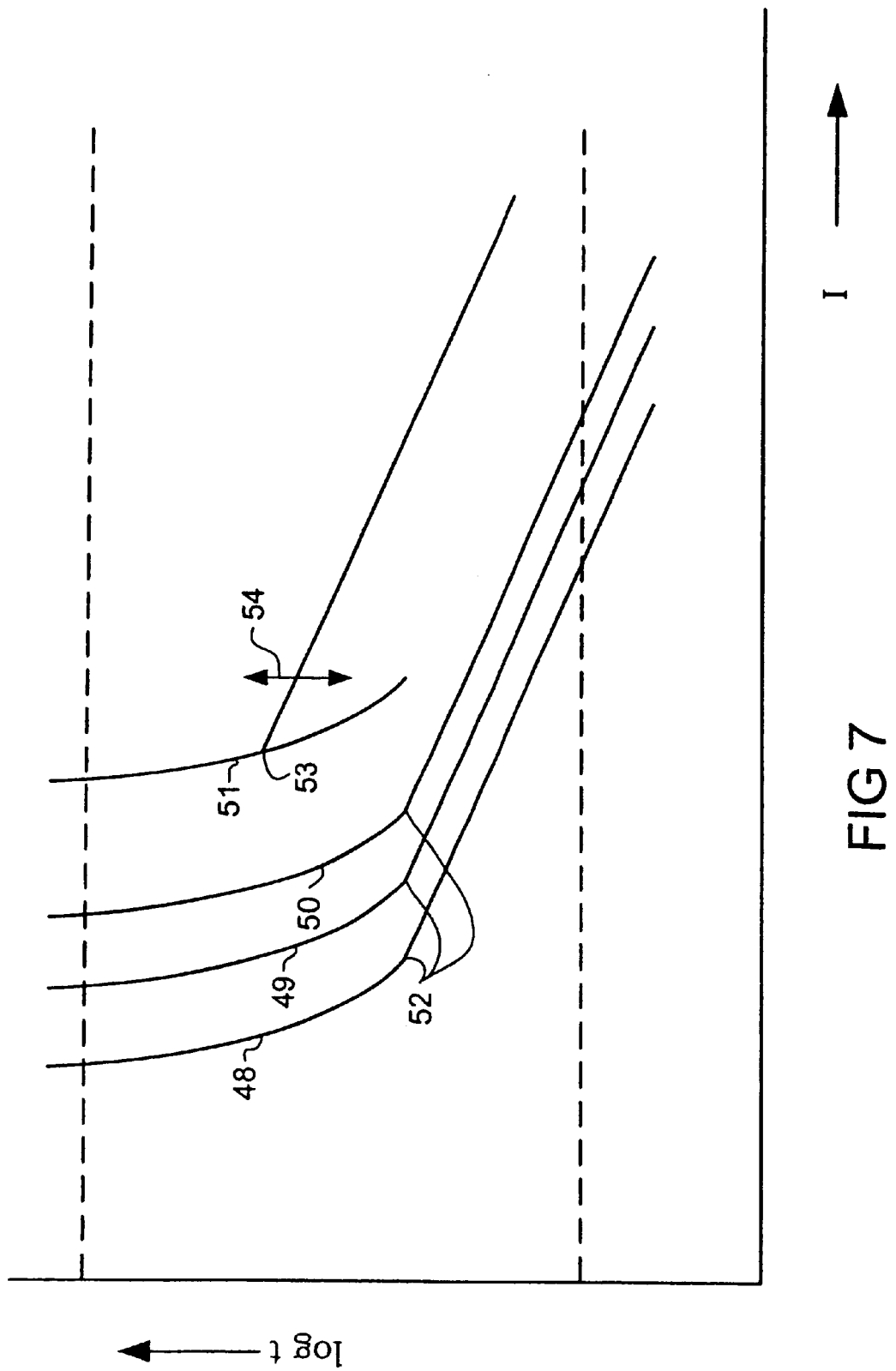

ELECTRONIC TRIPPING DEVICE FOR A CIRCUIT BREAKER

FIELD OF THE INVENTION

The present invention relates to an electronic tripping device for a circuit breaker used to connect and disconnect power from a load circuit. The circuit breaker having the following features:

includes a computing unit for comparing limits of one current to a current flowing in the load circuit and for generating a tripping signal to switch off the circuit breaker once a time delay assigned to the limit has elapsed. Pairs of values of current limits and the assigned delays represent a predetermined tripping curve.

BACKGROUND INFORMATION

A tripping device of this type mentioned above is described in U.S. Pat. No. 5,311,392. In this context, the tripping curve is composed of a plurality of sections representing the relationship between a current in the load circuit and a delay of the tripping signal. A nonlinear section of the curve is provided to simulate a bimetallic trip particularly for the overload range and a fixed response threshold being provided to produce an immediate tripping signal for very high currents arising out of a short circuit.

If a plurality of circuit breakers having tripping devices of the type described are present in equipment for supplying electric power, a desired coordination of the protection effects from the individual circuit breakers can be achieved by suitably setting the tripping devices. However, it is not unusual for fuses, in particular of the NH (low-voltage high-power) or HRC (high rupturing capacity) type, to be used in equipment for supplying electrical power along with circuit breakers having electronic tripping devices. Since fuses, in contrast to electronic trips, have a continuous response curve, undesirable overlapping in the behavior of the protection elements (circuit breakers and fuses) may result.

The problem of suitable coordination is generally described in greater detail in the German technical book, "Low-Voltage Handbook" by Theodor Schmelcher, Siemens AG, 1984, pp. 84–87. Means and processes for coordinating circuit breakers and fuses are also described in, for example, from U.S. Pat. No. 4,245,318 and U.S. Pat. No. 5,402,299.

In general, conventional electronic trips make it possible to simulate approximately the response curve of a fuse using their various setting mechanisms for selecting and sizing various parameters. For this purpose, circuit elements or program routines are used to represent curves having an I2t, I3t and I4t characteristic. However, reliable operation of such setting mechanisms is reserved only for trained experts, making the described coordination of circuit breakers and fuses difficult for users. For this reason, coordination is complicated regardless of the aids used and may result in errors and consequential damage.

SUMMARY

An object of, the present invention is to simplify the coordination between circuit breakers and fuses and thus improve the protection of electrical equipment.

To achieve this objective, the present invention provides a tripping device that includes circuitry for generating a tripping curve corresponding to the response curve of a fuse. The tripping device can be controlled using a single setting mechanism representing the nominal currents or rated currents of fuses.

Significant simplifications result from this for the design and subsequent operation of switchgear. The operator can perform the required coordination by directly setting a suitable nominal fuse current on the electronic trip, thus avoiding the errors that previously occurred. The setting mechanism can be either infinitely variable or set to discrete fixed values.

A further improvement in equipment protection is achieved according to a further development of the present invention in that the trip curve is inflected below one time limit in a lagging manner, bringing about an increase in the selectivity limit and a correspondingly increased nominal switching capacity of the circuit breaker. These features are based on the fact that the response curves of fuses in the pertinent standards are defined only up to a response time of 100 ms and vary greatly in the case of shorter and, in practice, more important times. The point of inflection in the response curve may be adjustable on the trip. In addition, the point of inflection can be selected as a function of the circuit breaker size.

The present invention can be realized in conjunction with electronic trips of the most varied type. In particular, trips can be used whose computing unit has a microprocessor, which includes a program memory for program steps for the cyclic processing of currents detected by current sensors in the load circuit and for comparing the currents with a tripping curve selected by the setting mechanism in accordance with a response curve of a fuse. In this configuration, a read/write memory for pairs of values of the response values and corresponding fuse delay times of different fuses, that can be selected by the setting mechanism, can be allocated to the microprocessor system. An additional suitable possibility is to allocate to the microprocessor a function generator for providing a mathematically approximate representation of trip curves corresponding to the response curves of fuses. Approximation formulas for the response curves of fuses are described in, for example, the German journal ETZ, Year 58, 1937, Issue 25, pp. 684–686.

The present invention can also be used in conjunction with trips of the analog type. This can be done by providing an analog computing module to compare analog parameters of a mathematical approximation equation for the response curve of a fuse and by designing the setting mechanism for setting the aforementioned parameters jointly, there being provided at least one parameter as a function of the current in the load circuit and one parameter as a function of the heat balance of a selected type of fuse. The analog computing module generates a trip signal for tripping the circuit breaker when a positive threshold is reached.

For a user, it may be advantageous if the setting mechanism has a plug-in design and if a receptacle for the plug-in setting mechanism is located on a control panel of the tripping device, the setting mechanism representing one single nominal current, or rated current, of a fuse. A setting mechanism of this type may also be used like a rating plug that is familiar in tripping devices, or like a screw-in fuse.

As mentioned above, electronic trips can have numerous setting mechanisms. In one refinement of the present invention, the plug-in setting mechanism can have a signal generator for transmitting a signal to the computing unit to take into account trip curves determined exclusively by the setting mechanism and corresponding to a fuse and, at the same time, deactivating any other setting mechanisms present for other types of trip curves. This ensures that only the desired fuse curve is activated and is not unintentionally changed by additional settings.

As an additional measure for a safe operation, it may be advisable for the tripping device and the housing of the circuit to have coding means that cooperate. In particular, the plug-in setting mechanism can be provided with an alignment pin corresponding to the assigned nominal current, or rated current, and the receptacle can be provided with an adapter screw that corresponds to a selected permissible rated current of the load circuit for the circuit breaker, such that a plug-in setting mechanism having a value exceeding the specified nominal current, or rated current, cannot be brought in engagement with the receptacle. This configuration is similar to the proven use of adapter screws, or alignment sleeves, in fuses in panel boxes.

Finally, the plug-in setting mechanism can be used in a tripping device that incorporates additional setting mechanisms for tripping curves that do not correspond to the response curve of a fuse, the plug-in setting mechanism being equipped with a front panel covering the additional setting mechanisms mentioned. This configuration makes it possible to create an electronic trip of a design that can be used universally and that is suitable for use both for the known trip curves and for fuse curves, and that clearly communicates the selected mode of operation to the user. In conjunction with this, the front panel of the tripping device and the housing of the circuit breaker can be equipped with interacting coding means.

As already mentioned, the described setting mechanisms can be designed so as to be similar to the conventional rating plugs. In this connection, it has proven to be advantageous to design a setting mechanism of the type explained above as a rating plug, thus further simplifying the operation of the new protection system for electrical industrial and building systems.

BRIEF DESCRIPTION OF THE DRAWINGS

FIG. 7 shows a graph of a tripping curves that simulate fuses and that also exhibit a point of inflection.

DETAILED DESCRIPTION

Figure 1:
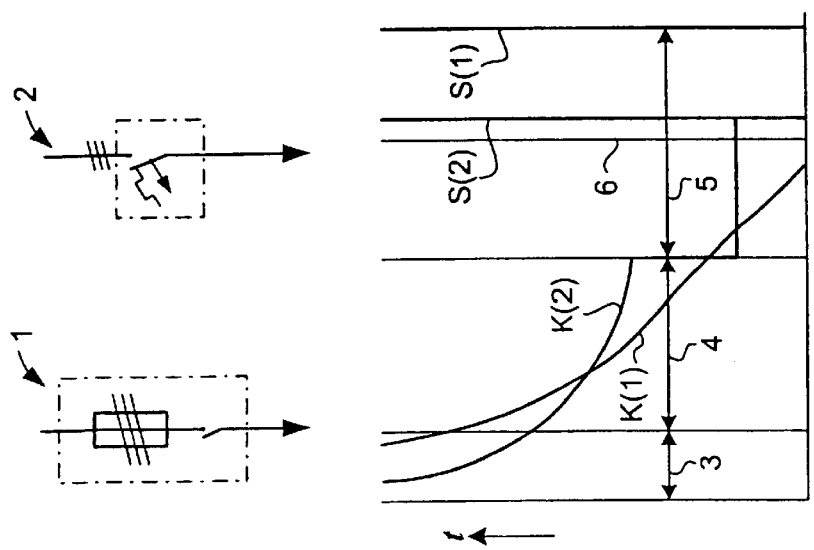
FIG. 1 shows the response curve of a fuse and the response curve of a circuit breaker in a schematic representation.
Figure 4:
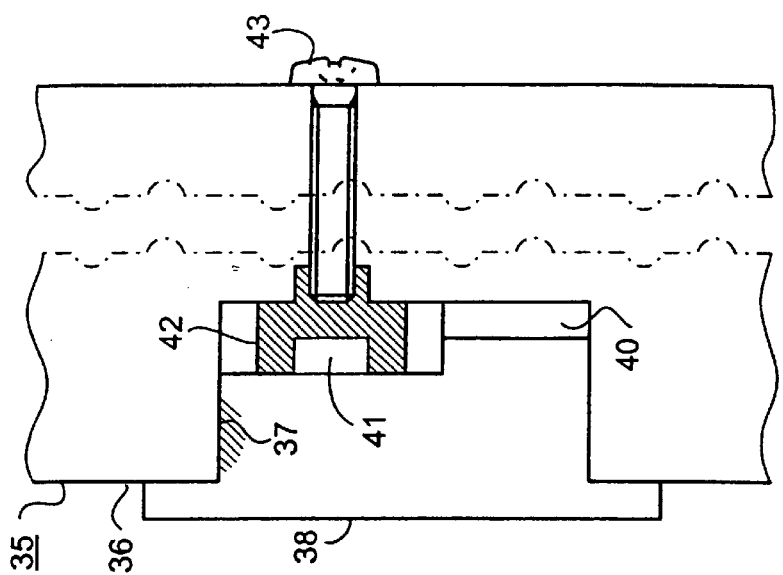
FIG. 4 shows a control panel for an electronic tripping device having a plug-in setting mechanism for a nominal current, or rated current, of a fuse.

In the graph of FIG. 1, curves K(1) and K(2) for the response or tripping times of a fuse 1 and of a circuit breaker 2, respectively, are shown as a function of current I on a logarithmic scale. The illustration applies to the case where the rated current of fuse 1 is as large as the setting current for circuit breaker 2 for thermal tripping. In the right portion of the graph, switching capacity S(1) of fuse 1 and S(2) of circuit breaker 2 are shown as lines parallel to the time axis. In addition, maximum short circuit current Ik, to be expected at the installation location, is shown in FIG. 1 as straight line 6. The range of variation for the minimum response current of fuse 1 or for the minimum tripping current of circuit breaker 2 is designated as 3. Adjacent range 4 is the response or tripping range for overload, while range 5 applies to the behavior in the event of short circuit currents. As can be seen, depicted curves K(1) and K(2) intersect or come impermissibly close, which can result in disruptive power shutdowns in power supplying equipment. If, on the other hand, the fuses and circuit breakers are selected or set so that there is no intersection, the protective effect may be inadequate or unnecessarily pronounced in comparison to the previous case.

This problem, which occurs especially in the power supply equipment of large buildings, is solved by the present invention in that the circuit breakers to be combined with fuses can be set in a simple manner so that the tripping curve of the circuit breakers corresponds to the response curve of a fuse. Following FIGS. 2, 3, 4, 5, and 6 illustrate suitable means for realizing this idea.

Figure 2:
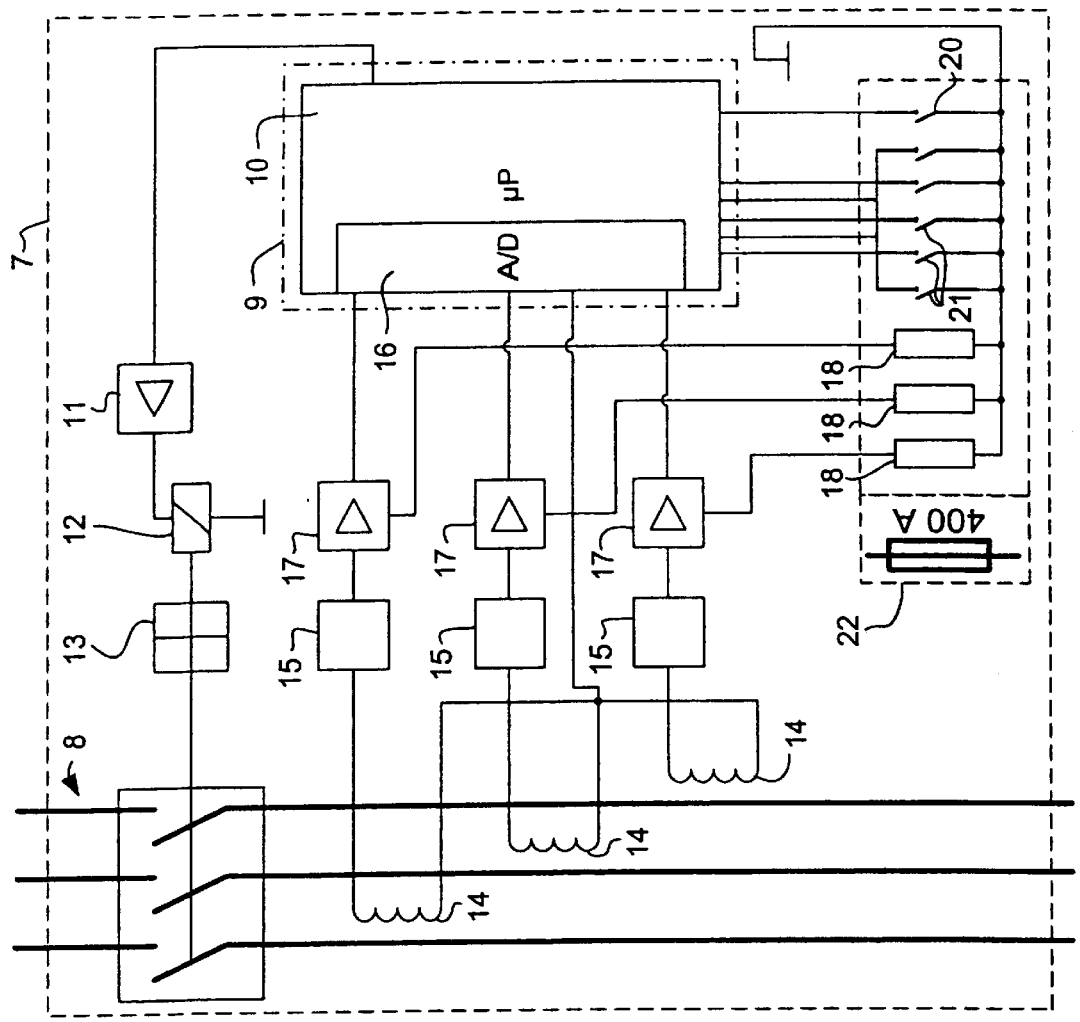
FIG. 2 depicts a block diagram of an electronic tripping device that has a microprocessor and whose tripping curve can be set to the response curve of a fuse.

The exemplary embodiment shown in FIG. 2 is based on the fact that a multi-pole, low-voltage circuit breaker 7 for opening switch contacts in main circuits 8 is equipped with an electronic tripping device 9. For this purpose, tripping device 9 incorporates in a conventional manner a microprocessor device 10 (that is, a microprocessor and all the peripheral components and circuitry necessary for its operation) and an output amplifier 11 to control a tripping solenoid 12 that actuates a breaker mechanism 13.

The particulars for actuating the switch contacts in main circuits 8, their latching in the on position, and their release to interrupt a load circuit will not be discussed here because these details are generally conventional and are not necessary to understand the present invention.

Signals that are proportional to the currents flowing in the main circuits 8 are fed to the tripping device 9. Nonferrous current sensors 14 having downstream integrating amplifiers 15 are shown in FIG. 2 as a means for supplying the aforementioned signals. However, the output signals of integrating amplifiers 15 are not fed directly to one of A/D converters 16 allocated to microprocessor device 10, but rather pass through a scaling amplifier 17, whose gain is determined by one resistor 18 for each of scaling amplifiers 17.

Coding switches 20 and 21 form a setting mechanism 22 that permits converting triggering device 9 to a tripping curve corresponding to a fuse. In this context, coding switch 20 controls tripping device 9 such that all other setting mechanisms required for curves corresponding to curve K(2) shown in FIG. 1 are disabled and, instead of this, response curves of fuses are provided. The nominal currents of these response curves are selected by the user using coding switch 21 in setting mechanism 22.

In this way, the user of tripping device 9 can, simply by actuating setting mechanism 22, cause the protective effect of circuit breaker 7 to correspond to a fuse having a specific rated current. This represents a considerable simplification with respect to the procedure previously required for a comparable purpose. At the same time, the design of tripping devices of circuit breakers is simplified because the circuitry and the corresponding setting mechanisms for curve sections having an I3t and/or I4t characteristic are unnecessary.

FIG. 2 also shows, by means of a dashed-line frame around resistors 18 and coding switches 20 and 21, that the aforementioned components are combined into setting mechanism 22, thus becoming a "combined rated current and safety plug."

In the exemplary embodiment shown in FIG. 2, the tripping curve corresponding to a fuse can be realized by a memory containing tables of values for assigning currents and delays.

The same purpose can be achieved using a function generator that provides continuous curves. The present invention is not limited to tripping devices containing a microprocessor but can also be realized in electronic trips that operate in an analog manner. This is explained in the following, on the basis of FIG. 3.

Figure 3:
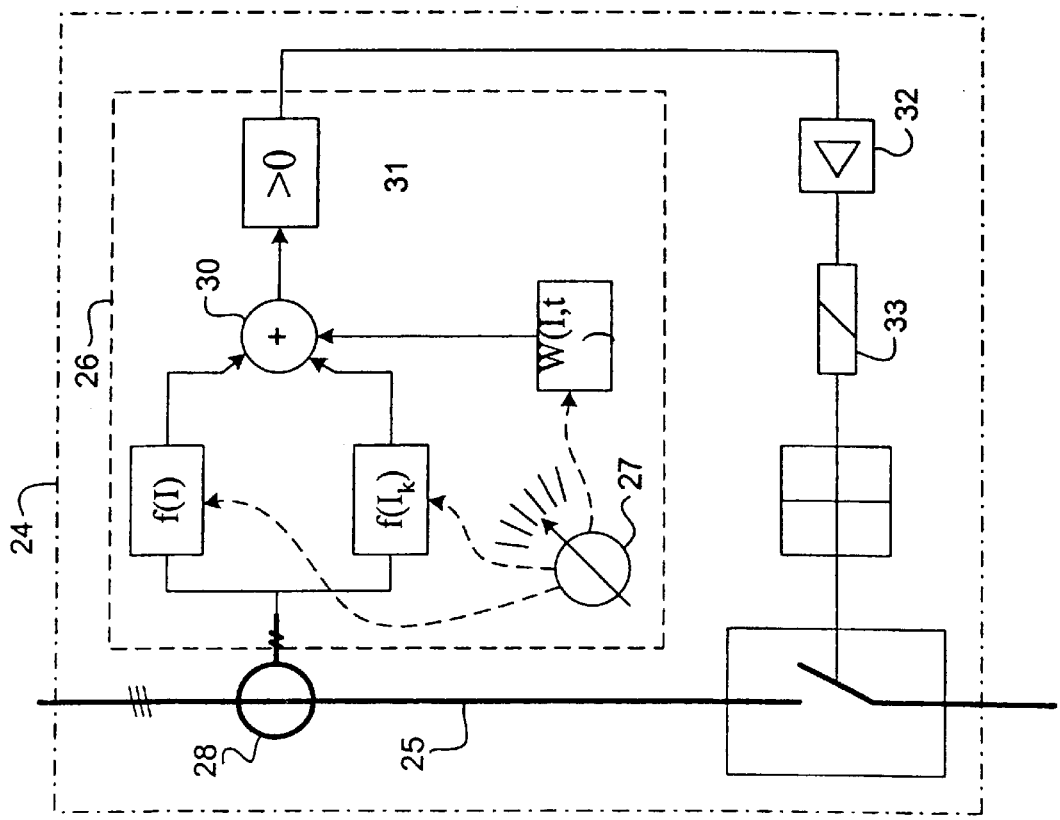
FIG. 3 illustrates a further exemplary embodiment of an electronic tripping device in which the tripping curve corresponding to a fuse is realized using analog circuitry.

FIG. 3 illustrates, in simplified, single-pole form, a low-voltage circuit breaker 24 having one main circuit 25, the circuit breaker being equipped with an analog electronic tripping device 26. This device is used especially to simulate the response curves of fuses and has, for this purpose, a single setting mechanism 27 that, to simulate the response curves, influences three functional values jointly, namely a parameter f(I) derived from current I measured by a current transformer 28, a parameter f(Ik) that is a function of the short circuit current, and a parameter W for the heat dissipation of the fuse to be simulated, this last parameter being a function of time t. The aforementioned parameters are added in an adder 30 and, under normal operating conditions, result in a negative value. If, on the other hand, a positive value is found at the adder 30 by a comparator 31, this means that an overload or short circuit is present, and main circuit 25 of circuit breaker 24 must be opened. To do this, comparator 31 controls a tripping solenoid 33 via a switching amplifier 32.

In distribution boards having replaceable fuses used in installation engineering in buildings, it is customary to use protective device in the form of, for example, adapter screws or adapter sleeves depending upon the type of fuse used. Both types of protective devices have the property that they prevent the use of a fuse having a nominal current that is too high. This proven principle can be used within the framework of the present invention such that, in a plug-in version of the setting mechanism for a fuse to be simulated, an alignment pin is mounted on the setting mechanism, and a protective devices of the type mentioned is mounted in the electronic tripping device, only the manufacturer or an authorized operator being capable of replacing the protective means.

One example for a configuration of the type described above is shown in FIG. 4. A cut-away view of an electronic tripping device 35 is shown in this Figure. A receptacle 37 for a plug-in setting mechanism 38 is located in a control panel 36 of triggering device 35, the mechanism representing a fuse having a specific rated current. Contact pins for a socket 40 situated in the receptacle are located on the back of setting mechanism 38, to provide for a programming of tripping device 35 in order to simulate the aforementioned fuse. In addition, tripping mechanism 38 has an alignment pin 41 that cooperates with an adapter screw 42. In the conventional manner, the adapter screw can be designed so that it can only be actuated using a special tool. However, even greater security against unintentional or unauthorized contact can be achieved according to FIG. 4 in that the adapter screw is mounted using a retaining screw 43 accessible only on the back of tripping device 35. In this manner, retaining screw 43 can only be loosened after removing tripping device 35 from the corresponding circuit breaker, which is only possible after overcoming the safety and locking equipment. In this way, the danger of impermissible manipulation is eliminated to a large extent.

Figure 6:
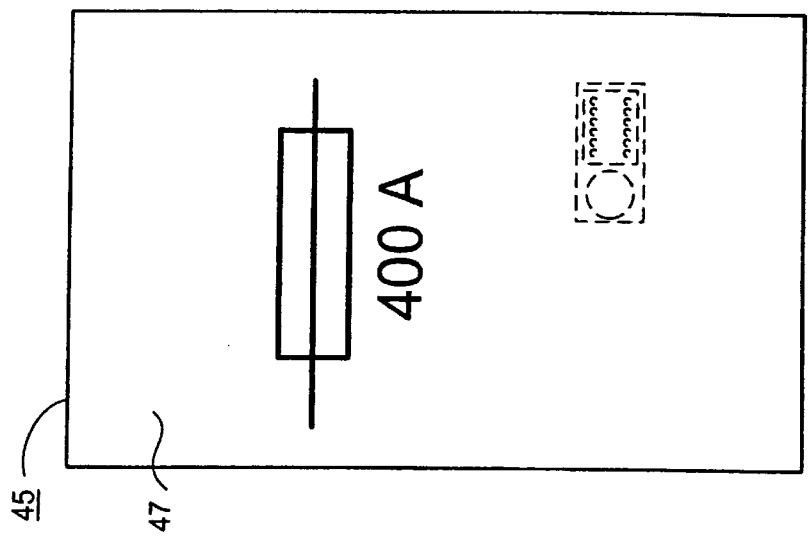
FIG. 6 shows a plug-in setting mechanism suitable for this purpose, that also has a cover panel for additional setting mechanisms of the tripping device.
Figure 5:
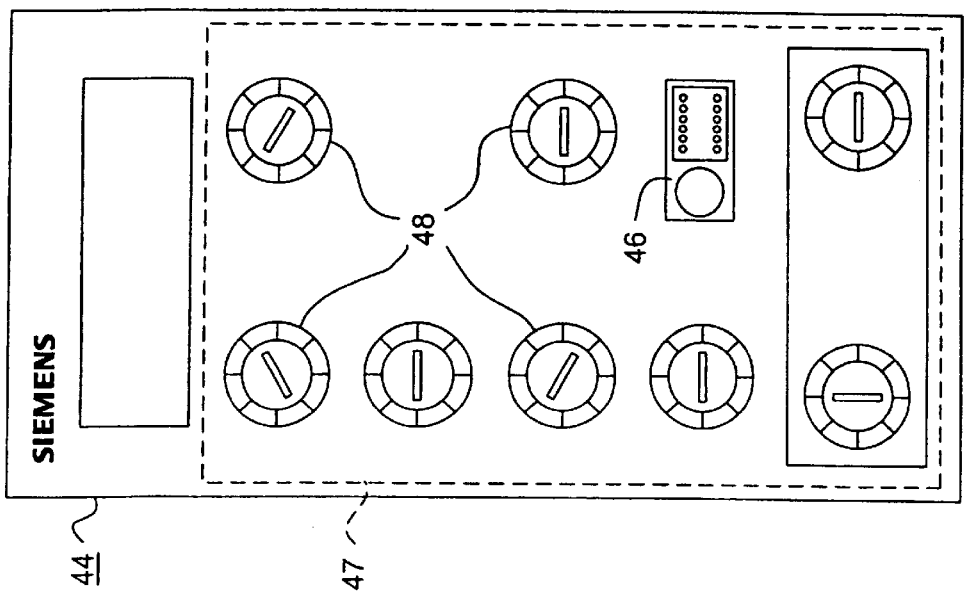
FIG. 5 illustrates a control panel of a tripping device for two modes of operation.

The design of a plug-in setting mechanism 45, shown in FIGS. 5 and 6, is well suited for an electronic tripping device 44 that makes possible both modes of operation explained (conventional trip curve of a circuit breaker or response curve of a fuse). This setting mechanism is to be inserted in a receptacle 46 in the same manner as setting mechanism 38, shown in FIG. 4. In addition, however, setting mechanism 45 is provided with a front panel 47 (FIG. 6), that covers up all other setting mechanisms 48 (FIG. 5) and that makes clear to the user the successful conversion of the tripping device to another mode of operation in connection with a circuit symbol for a fuse, located on the front panel. The area covered in response to the use of tripping mechanism 45 is shown by dashed lines in FIG. 5.

As explained above, the response curves of fuses are defined in the pertinent standards only up to a trip time of 100 ms. This is based on the fact that the response values of fuses vary greatly in the range below 100 ms. On the other hand, the range in question for protecting loads and equipment is substantial. An improvement in protection is achieved by the curves shown in FIG. 7. Curves 48, 49, 50, 51, that simulate fuses and that extend below the aforementioned limit of 100 ms, are shown in this Figure. However, these curves do not follow one continuous path but rather have a point of inflection 52 or 53 from which the further path is changed in a lagging manner. In this context, point of inflection 52 is situated at the same response time in the path of curves 48, 49 and 50, while point of inflection 53 can be changed in the path of curve 51 as indicated by double-headed arrow 54. As a result of the curves containing a point of inflection, an increase in the selectivity limit and an increased nominal switching capacity of the circuit breaker, operated using these curves, are achieved.

What is claimed is:

1. An electronic tripping unit for switching on and off a circuit breaker used for a load current circuit, comprising:
   a processing unit configured to compare limit values of a current to a current flowing in the load current circuit, wherein value pairs of limiting values of the current and assigned time delays represent a predetermined, characteristic tripping curve, the processing unit emitting a tripping signal for switching off the circuit breaker when the time delay assigned to the limit value in accordance with the tripping curve, is exceeded;
   a single preset control mechanism; and
   a circuit arrangement for forming response characteristics of fuses, the circuit arrangement being provided with characteristic curves that simulate nominal or operating currents, a selection of the simulated characteristic curves being determined exclusively by the single preset control mechanism, a selected nominal or operating current being represented by the single preset control mechanism, the simulated characteristic curve corresponding to the selected nominal or operating current being set as the tripping curve.

2. The electronic tripping device according to claim 1, wherein the processing unit includes a microprocessor system having a program memory storing program steps for cyclic processing of currents detected by a current sensor in the load circuit and for comparing the currents to the tripping curve.

3. The electronic tripping device according to claim 2, further comprising:

a read/write memory allocated to the microprocessor system, the read/write memory storing pairs of values of response values and corresponding fuse delay times of different fuses, the preset control mechanism selecting from the stored pairs of values of the response values and corresponding fuse delay times.

4. The electronic tripping device according to claim 2, further comprising:

a function generator allocated to the microprocessor, the function generator configured to provide a mathematically approximate representation of trip curves corresponding to response curves of fuses.

5. The electronic tripping device according to claim 1, further comprising:

an analog computing module configured to compare analog parameters of a mathematical approximation equation for the tripping curve, wherein the preset control mechanism is configured to change the parameters jointly, at least one of the parameters being a function of a current load, and at least another of the parameters being a function of a heat balance of a selected type of fuse, the analog computing module configured to generate a trip signal for tripping the circuit breaker when a positive threshold is reached.

6. The electronic tripping device according to claim 1, wherein the preset control mechanism is configured as a plug-in device, a receptacle for the plug-in device being arranged on a control panel of the tripping device, the present control mechanism representing only one nominal current or rated current.

7. The electronic tripping device according to claim 6, wherein the plug-in device includes a signal generator for transmitting a signal to the processing unit to take into account trip curves that are determined exclusively by the plug-in device and that responds to a fuse and, at the same time, to deactivate any other setting mechanisms present for other types of trip curves.

8. The electronic tripping device according to claim 6, wherein the plug-in device has an alignment pin corresponding to an assigned nominal current or rated current, and wherein the receptacle has an adapter sleeve that corresponds to a selected permissible nominal current or rated current of the load circuit so that if the plug-in device has a value exceeding the selected permissible nominal current or rated current of the load circuit, the plug-in device cannot be brought into engagement with the receptacle.

9. The electronic tripping device according to claim 8, further comprising:

a housing, the housing of the electronic tripping device and a housing of the circuit breaker having coding arrangements that cooperate.

10. The electronic tripping device according to claim 1, wherein the preset control mechanism is configured as a rated-current plug.

11. The electronic tripping device according to claim 1, wherein the tripping curve is inflected below a specified time in a lagging manner.

12. The electronic tripping device according to claim 11, wherein a position of the point of inflection in the tripping curve is adjustable.

13. The electronic tripping device according to claim 11, wherein a position of the point of inflection in the tripping curve is selected as a function of a size of the circuit breaker.

14. The tripping unit according to claim 6, further comprising:

additional preset controls for selecting and dimensioning a plurality of parameters; and a front panel coupled to the preset control for covering the additional preset controls;

wherein an additional tripping characteristic curve is provided that is based on the selection and dimensioning of the plurality of parameters using the additional preset controls.

15. The electronic tripping device according to claim 14, wherein the front panel protrudes beyond the tripping device, the front panel and a housing of the circuit breaker including coding arrangements that cooperate.

* * * * *